Figure 1:
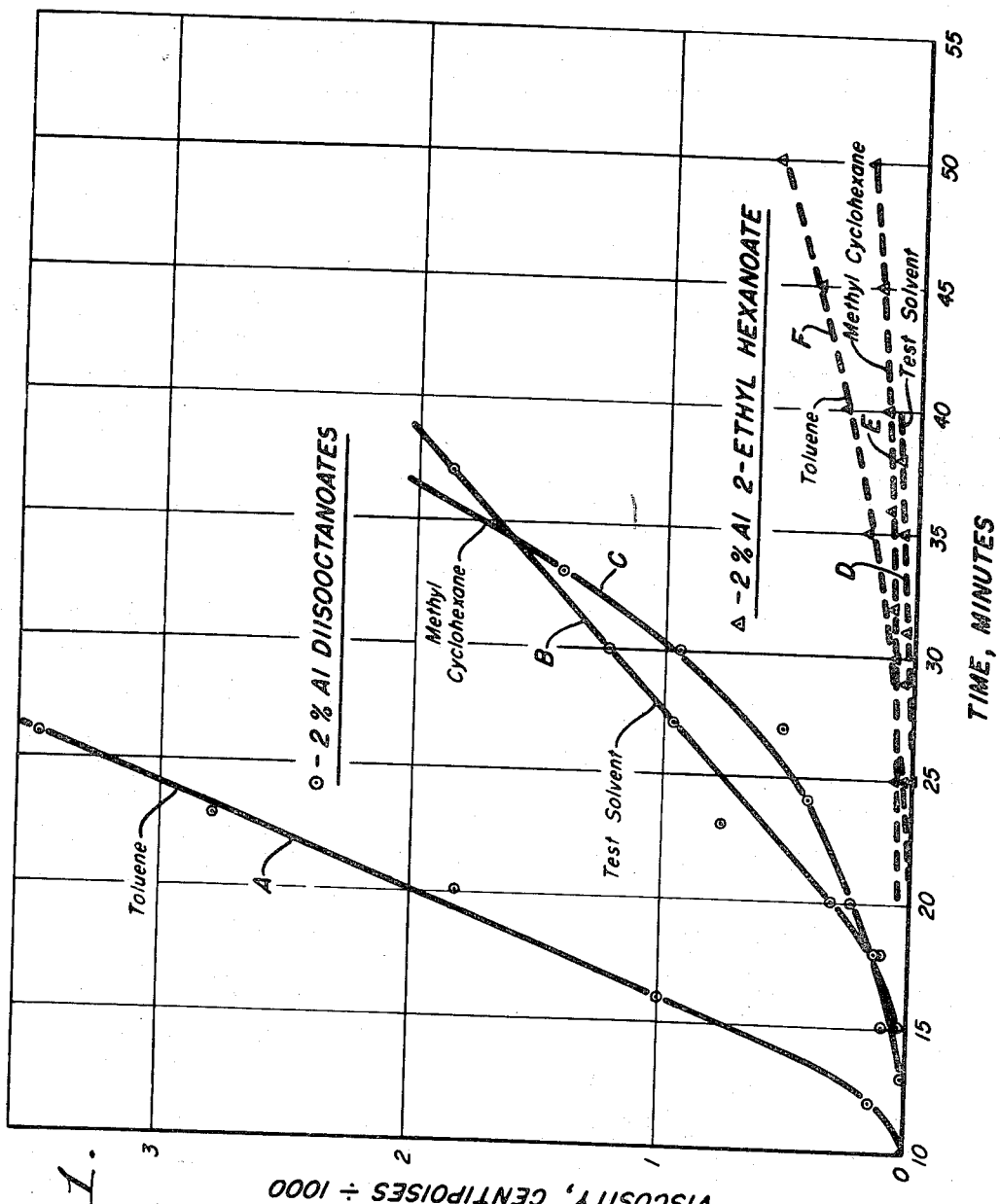

United States Patent Office 2,751,361
Patented June 19, 1956

2,751,361
LIQUID HYDROCARBON GELLING AGENTS

Richard E. Van Strien, Griffith, Ind., and Philip H. Towle, Chicago, and Philip Hill, Lansing, Ill., assignors to Standard Oil Company, Chicago, Ill., a corporation of Indiana Application June 14, 1954, Serial No. 436,355

13 Claims. (Cl. 252—316)

This invention relates to improvements in the preparation and use of bodying agents for organic liquids. More particularly, the invention pertains to improved hydrocarbon gel compositions and to gelling agents useful in forming liquid hydrocarbons into gels. Specifically, the invention is directed to the preparation and use of bodying agents adapted to form stable, moisture resistant gels of relatively high consistency with a wide range of petroleum gasolines, kerosenses, diesel fuel, and jet fuel, preferably liquid hydrocarbons boiling within the range of from about 100° to 600° F. Such solidified or gelled liquids are useful as charges for incendiary bombs, grenades, flame throwers, and the like. This is a continuation in part of our copending applications entitled "Gelling Hydrocarbon Liquids," Serial Number 296,132, filed June 28, 1952 (now abandoned), and "Gelling Agents for Hydrocarbons," Serial Number 401,399, filed December 30, 1953 (now abandoned).

Extensive research and field tests have established a number of exacting requirements for military incendiary gels. They must be stable at temperatures over the range of from about −40° C. to +65° C. so that they may be used in any climate. Under storage conditions, they must not break down with loss of viscosity. They must have sufficient cohesion to prevent premature dispersion. They must adhere to a target sufficiently long to set it on fire. They must be capable of easy ignition even at sub-zero temperatures. In addition, it is highly desirable that the gelling agent be capable of forming gels which meet these requirements with a wide variety of hydrocarbon fuels relative to boiling range and type of hydrocarbon components which make up the hydrocarbon fuels, as well as fuels containing additives such as metal deactivator additives. Such gels should be formed rapidly when relatively small amounts of the gelling agent are employed.

Heretofore, gelling agents for hydrocarbon liquids have been known in the art, but in general they have not met all of the requirements nor have they had the versatile properties outlined above. For the most part, known gelling agents have been inadequate in one or more of the above requirements and the gels could not be formulated from liquid hydrocarbons of diverse boiling ranges and/or diverse compositions by simple stirring or mixing of the gelling agent at ambient temperatures. They have been unsatisfactory for the additional reason that their rate of gelling hydrocarbon liquids is greatly effected by the temperature of admixing. Also they were not capable of forming satisfactory gels within a reasonable time when reasonable amounts are added to such hydrocarbon mixtures as aviation fuels containing substantial amounts of isooctane.

It is therefore a primary object of the invention to provide a gelling agent which is effective in small amounts at ambient or ordinary temperatures and which can be incorporated by simple mixing or stirring into a variety of hydrocarbon liquids, such as hydrocarbon fuels containing isooctane, to produce stable gels suitable for military purposes. Another object of the invention is to provide a gelling agent which can be used to produce stable gels from liquid hydrocarbons which contain metal deactivator additives such as N,N'-disalicylidene-1,2-diaminopropane. Still another object of the invention is to provide a gelling agent which has reproducible gelling characteristics and is uniform in its gelling action and can be used on a wide variety of hydrocarbon fuels and fuel components. An additional object of the invention is to provide a method for producing a universal gelling agent which operates at ordinary temperatures to gel normally liquid hydrocarbon fuels containing mixtures of paraffins, naphthenes, isoparaffins and/or aromatics to form incendiary gels particularly suited for military uses.

A further object is to provide a gelling agent which promotes gelling in short periods of time in a wide range of hydrocarbon solvents when used at relatively low concentrations. A still further object is to provide a gelling agent having a gelling rate which is less sensitive to temperature. Another object is to provide a gelling agent suited for military purposes, the gelling properties of which, such as stability against breakdown and viscosity changes of hydrocarbon gels made therefrom, are not adversely affected by contacting with humid atmosphere or casual water. Still another object of the invention is to provide a gelling agent which will gel liquid hydrocarbons such as gasoline, jet fuel, and petroleum distillates of kerosene boiling range at relatively low concentrations in short periods of time to produce gels having relatively high viscosities, which viscosities are not adversely affected by storage under conditions of variable atmospheric conditions of temperature and humidity. An additional object is to provide an effective gelling agent of relatively high density and thereby minimize the service necessary for storing and transportation of the gelling agent. Further objects will appear from the detailed description of the illustrative embodiments of the invention set out hereinafter.

Our aluminum soap gelling agents consist essentially of mixtures of basic aluminum branched chain alkanoates containing alkanoate radicals having from 8 to 13 carbon atoms per alkanoate radical, said alkanoates having an average of two alkanoate radicals attached to the same aluminum atom. That is, the soap corresponds approximately to a mixture of hydroxy aluminum dialkanoates. The branches of the alkanoate radicals are predominantly methyl although substantial amounts of ethyl and/or propyl branching is permissible. However, in any case, the methyl groups predominate the aggregate of the branches in the alkanoate radicals. The soaps can be separately prepared and physically mixed, but we prefer to prepare the mixture of basic aluminum branched chain alkanoates by coprecipitation from an aqueous solution of at least two alkali metal branched chain alkanoates having the same or different number of carbon atoms and having different carbon chain configuration with respect to number of branches, and/or position of branching on the carbon chain and/or number of carbon atoms in the branches, that is, methyl, ethyl, or propyl.

The mixture of basic aluminum alkanoates is incorporated in normally liquid hydrocarbons such as gasoline, kerosene, diesel fuels, jet fuels, aviation gasoline, and petroleum naphthas generally of boiling range of from about 100° F. to about 600° F. to form gels of said liquid hydrocarbons suitable for use as military incendiaries. Suitable gels are obtained at concentrations of from about 0.5 to about 10% by weight of the alkanoate gelling agent, the amount of gelling agent incorporated varying within this range depending on the consistency of gel desired, on the required stability of the gel produced, on the hydrocarbon material to be gelled and on the rate of gelation required.

The preparation of our preferred gelling agent involves a series of reactions which include producing branched heptenes, branched octenes, branched nonenes, branched decenes, branched undecenes, branched dodecenes, and/or mixtures of these by reacting a hydrocarbon stream containing (1) propylene, (2) butenes, and/or (3) mixtures of propylene with butenes in the presence of an acid-type catalyst; fractionating the reaction product to obtain fractions consisting essentially of mixtures of isomeric polymers having 7 to 12 carbon atoms per molecule to obtain the desired branched chain olefin or olefins; reacting the branched chain olefins with carbon monoxide and hydrogen in the presence of a cobalt containing catalyst to produce mixtures of branched chain alkanals and branched chain alganols, i. e., by the well-known oxo process; and converting the mixture of alkanals and alkanols to the corresponding alkali metal soaps, either directly by fusion with alkali metal hydroxide or by first hydrogenating the mixture to convert the alkanal components to the corresponding alkanols and then fusing the alkanols with alkali metal hydroxide to produce a mixture of alkali metal branched chain alkanoates, precipitating mixed basic aluminum branched chain alkanoate soap from a basic aqueous solution of the alkali metal branched chain alkanoates and drying said precipitated basic aluminum soap. We prefer to fractionate the oxo product mixture to eliminate oxo bottom (polymer) product and then hydrogenate the purified alkanal-alkanol mixture to a product substantially free of alkanals. The crude product is then refractionated to obtain a purified alkanol product. The purified alcohol fraction, i. e., alkanol fraction, is heated with an alkali metal hydroxide to convert the purified alkanol product to a mixture of the alkali metal salts of the corresponding alkanoic acids.

The basic aluminum alkanoate soaps are prepared by contacting an aqueous solution containing the alkali metal alkanoate soap and about one mol of alkali metal hydroxide for every two mols of alkali metal alkanoate in said solution with an aqueous solution of an inorganic salt of aluminum, preferably an aqueous solution of aluminum chloride and thereby precipitating the corresponding basic aluminum alkanoate. The preparation of the basic aluminum soap is completed by washing the precepitate substantially free of water soluble components and drying the washed precipitate to a moisture content below about 1.5%, preferably below about 1.0%, for example from about 0.2% to about 0.5%, and grinding the product to particle size to pass through a #40 U. S. Standard sieve.

The aqueous solution of alkali metal alkanoates described above contains not more than about 1.0% of straight chain alkanoate radical structures and less than 0.3% of 2-ethylhexanoate radicals when the copolymer of propylene and butenes is used as starting material. However, we may supply 2-ethylhexanoate radicals to the soap mixture in the preparation of our mixed basic aluminum branched chain alkanoate soap. This may be accomplished by adding 2-ethylhexanal or 2-ethylhexanol to the mixture prior to caustic oxidation step or the addition may be made by way of alkali metal 2-ethylhexanoate addition or by addition of 2-ethylhexanoic acid either to the alkanal-alkanol caustic oxidation mixture or the 2-ethylhexanoate radical may be supplied to the final product by alkali metal 2-ethylhexanoate addition to the solution from which the aluminum soap is precipitated or by the addition of 2-ethylhexanoic acid to the aqueous solution of alkali metal branched chain alkanoates prior to precipitation with the aluminum salt. Thus, upon precipitation we obtain coprecipitation of basic aluminum 2-ethylhexanoate along with the predominantly methyl substituted basic aluminum alkanoates. If desired, physical blends of the dried and pulverized oxo product aluminum soaps with other branched chain soaps, such as basic aluminum 2-ethylhexanoate soap, may be used to modify the gelation rate and to improve the gel properties of the gels produced therefrom as described heerinbelow.

The basic aluminum soaps, derived from oxoated olefin polymers and copolymers, are mixtures of a multiplicity of basic aluminum diisoalkanoate components, the alkanoate radicals of which are highly branched. A preponderance of the branches consist of methyl groups. Where precipitation of the basic aluminum soap is made from an aqueous solution containing only alkanoate radicals having the same number of carbon atoms per alkanoate radical, as for example only branched chain octanoate radicals or branched chain tridecanoate radicals, a plurality of said radicals having the same carbon chain configuration are present to the extent of at least 5% in the soap mixture. We refer to our novel branched chain alkanoate soaps as isoalkanoates and to their branched chain alkanoate radicals as isoalkanoate radicals. By the term "isoalkanoate radicals" we mean to define the acyl radicals of the material produced according to our invention from mixtures of isomeric branched chain alkanals and mixtures of isomeric branched chain alkanyl groups, the isomeric branched chains of the alkanals and alkanols predominating in substituted methyl group branches. These we define as isoalkanals and isoalkanols. The basic aluminum diisoalkanoates are defined as combinations of about two of such isoalkanoate radicals for each hydroxyl radical with one aluminum atom to make up the complex polymeric gelling agent. The aggregate of basic aluminum isoalkanoate components derived from the isoalkanals and isoalkanols by caustic oxidation followed by precipitation with the aluminum salt contain some molecules having the same branched carbon chain structure with respect to acyl radicals, i. e., isoalkanoate radicals, attached to the same aluminum atom. However, at least a part of the molecules of said aggregate are characterized by having attached to a common aluminum atom branched chain alkanoate radicals of different carbon chain configuration which results in heterogeneity with respect to carbon chain configuration of said isoalkanoate radicals in the gelation agent mixture. The isoalkanoate radicals are further characterized by having 5 to 10 carbon atoms in the longest straight carbon chain of the radicals. Using the Geneva system of nomenclature, the #1 carbon atom of the longest straight chain carbon configuration, i. e., the carboxy carbon of the alkanoate radical, is included in defining the longest straight chain carbon structure in the specification and in the claims. Thus, the isooctanoate radicals have 5 to 7 carbon atoms in the longest straight chain structure. The radicals of the branched chain isooctanoate soap mixture consist chiefly of methyl heptanoates and dimethyl hexanoates with substantially no more than about 1.0% of normal octanoate radicals (caprylate) and less than about 0.3% 2-ethylhexanoate when obtained from $C_3= + C_4=$ copolymer by the oxo process.

More specifically, our preferred gelling agent is produced by a series of reactions from branched monoolefins having from 7 to 12 carbon atoms per molecule which have been prepared by copolymerization of mixed $C_3$ and $C_4$ refinery olefinic gases or by polymerization of either propylene alone or by polymerization of butylenes. The preferred source of these olefins is the naphtha obtained from the polymerization of petroleum refinery gas streams containing propylene and/or mixed butenes. Many processes are known and used for carrying out this polymerization. An excellent and detailed summary of the better known of these processes is presented in an article by P. A. Marchwitz and L. M. Henderson, "Polymerization of Hydrocarbon Gases to Motor Fuels," Progress in Petroleum Technology (American Chemical Society, 1951), pages 83–96.

When using solid phosphoric acid catalyst, temperatures within the range of from about 325° F. to about 450° F. and pressures in the range of from about 400 to about 1500 p. s. i. g. are used in the polymerization reaction. The refinery stream containing mixed olefins will usually contain from about 30% to about 60% of mixed propylene and butylene, the mol ratio of propylene to total olefins varying from about 0.2 to 0.65. Optimum yields of heptenes are obtained at mol ratios of 0.3 to 0.4. It was found that the composition of the branched heptenes used as primary intermediate source material for producing isooctanoate soaps did not change appreciably when operating conditions are varied within these ranges.

The polymer containing from 7 to 12 carbon atoms, such as the branched heptenes, is subjected to the so-called oxo reaction. The description of the oxo process as applied to the conversion of olefins to aldehydes and alcohols is presented in an article by Peter W. Sherwood, "The Oxo Process in the U. S. for Petrochemicals from Olefins", Petroleum Processing 8, 2 (February 1953), p. 241–48. Another article directed to the oxo process is that of William G. Schroeder and Milton Orchin, "Oxo Reaction," Chem. Eng. 58, 3 (March 1951), p. 135–36. Complete descriptions with respect to operating conditions of the oxo process and hydrogenation of the oxo product to alcohols are taught in Leonard W. Russum and Robert J. Hengstebeck U. S. Patent 2,638,487, and William J. Cerveny U. S. Patent 2,638,488. Thus, an equimolar gaseous mixture of hydrogen and carbon monoxide, together with the polymer containing 7 to 12 carbon atoms is contacted in the presence of a cobalt-containing catalyst at temperatures within the range of about 250° F. to 400° F. and at a pressure of about 2500 to about 4000 p. s. i. If desired, higher ratios of $H_2$ to CO may be used, i. e., up to 2:1, to obtain a product relatively high in alcohol content. The reaction product comprises a mixture of branched chain alkanals and branched chain alkanols containing one more carbon atom per molecule than the molecules of the polymer in the feed to the process, along with unreacted olefins and small amounts of saturated hydrocarbons and heavy "polymer." The total reaction product is fractionated, as by steam stripping, to obtain a mixture of alkanals and alkanols essentially free of heavy polymer and containing only small amounts of non-oxoated hydrocarbon material.

The purified oxo product may be processed by two methods to obtain the alkali metal branched chain alkanoate intermediate from which the basic aluminum branched chain alkanoate gelling agent is finally produced. Thus, the purified oxo product may be hydrogenated in the presence of a catalyst such as nickel, cobalt, or copper chromite, and under conditions such that there is a minimum of degradation of the alkanols, i. e., no complete reduction of alkanols to the hydrocarbons. The hydrogenated product which consists essentially of branched chain alkanols and small amounts of hydrocarbons is carefully fractionated to produce essentially pure branched chain isomeric alkanols having the same number of carbon atoms per molecule or mixtures of branched chain isomeric alkanols of different number of carbon atoms within the range of 8 to 13 per molecule desired. The purified mixed alkanols are then converted directly to the alkali metal soaps of the corresponding branched-chain acids. This is accomplished by reacting the alkanols with an alkali-metal hydroxide such as sodium hydroxide in a stirred reactor at a temperature in the range of from about 600° F. to about 725° F., preferably from about 675° F. to about 720° F., and at pressures of from about 100 to 400 p. s. i. The alkali metal soaps are in turn converted to a mixture of basic aluminum branched chain alkanoates by double decomposition between one mol of an aluminum salt of an inorganic acid and about two mols of the alkali metal soap in aqueous solution containing sufficient free alkali metal hydroxide to provide one hydroxyl radical for every two alkanoate radicals in the solution. We have found that if the aluminum soap is prepared by treating the aqueous solution of the alkali metal branched chain isooctanoate soap with an aqueous solution of aluminum chloride, as distinguished from the sulfate, the aluminum soap is more stable to atmospheric moisture and produces more stable gels when commingled with liquid hydrocarbons. In addition to water stability, the aluminum isooctanoate obtained by such precipitation with the chloride produces gels of other superior properties as compared to those produced by treatment with the sulfate, as shown in Table 13 below. These improved gelling characteristics are particularly important at soap concentrations to produce gel consistencies suitable for portable flamethrower service.

As indicated above, the purified mixed alkanals and alkanols may be processed by an alternate method to produce the alkali metal branched chain alkanoate intermediate. Thus, the purified oxoated mixture may be fused with the alkali metal hydroxide, without undergoing the intermediate hydrogen reduction step, at temperatures considerably lower than are used for the fusion of the hydrogenated product, i. e., at temperatures within the range of from about 500° F. to about 620° F. to form the alkali metal branched chain alkanoates from the alkanal components and the temperature of fusion is then raised to the 675°–725° F. range to complete the oxidation of the alkanol components. The use of lower temperatures in a preliminary oxidation of the alkanals reduces the tendency to form peroxides and avoids aldol condensation impurities in the product so obtained. When operating in this manner, the product is preferably purified by fractionation as by steam stripping before precipitation of the basic aluminum diisoalkanoate soaps from an aqueous solution of the alkali metal soap. If desired, the alkali metal alkanoate soaps may be converted to the corresponding alkanoic acids by treatment with a mineral acid and the alkanoic acids may be purified by fractionation and the purified acids may be reconverted to the alkali metal soaps. The basic aluminum isoalkanoates may then be obtained by precipitation from an aqueous solution of the purified soaps. We prefer to hydrogenate the purified alkanal-alkanol mixture prior to caustic oxidation and thereby obtain a purer alkali metal branched chain alkanoate product from the purified alkanols prior to precipitation of the aluminum soap.

Although we prefer the mixed basic aluminum soaps prepared from alkali metal alkanoates, the alkanoate radicals of which are synthesized by oxoation of olefin polymers having 7 to 12 carbon atoms to the molecule, we have also discovered that excellent gelling agents for hydrocarbons can be prepared by compounding basic aluminum branched chain alkanoates, particularly basic aluminum branched chain octanoates, into soap mixtures containing additional alkanoate radicals which are either absent or present in only very minor amounts in the soaps derived from oxoated polymers. Thus, we have discovered that mixtures of soap containing 2-ethylhexanoate radicals and branched chain alkanoate radicals obtained from oxoated polymers, that is, isoalkanoate radicals, are superior to basic aluminum 2-ethylhexanoate per se for the rapid gelation of gasolines, jet fuels, diesel fuels, and petroleum naphthas in general. These mixed soaps may be prepared by simple physical blending of basic aluminum 2-ethylhexanoate with the highly methyl branched basic aluminum alkanoates, which are prepared by precipitation separately from aqueous solutions of the corresponding alkali metal isoalkanoates. We prefer to prepare the mixed soaps by coprecipitating the basic soaps from mixed aqueous solutions of the alkali metal 2-ethylhexanoate and alkali metal branched chain isoalkanoates using an aqueous solution of an inorganic aluminum salt as the precipitant. By this method single molecules containing both highly methyl branched isoalkanoate radicals and 2-ethylhexanoate radicals are produced in the highly methyl branched basic aluminum alkanoate soap mixture and these complex soap mixtures are highly effective gelling agents. Thus, basic aluminum 2-ethylhexanoate, when used alone as gelling agent for the gelation of test solvent, at 2% concentration requires a period greater than one or even two hours to obtain a gel and at 4% concentration a period of 14 minutes or more is required to obtain a gel at 77° F. Basic aluminum 3,5,5-trimethylhexanoate, when used alone as a gelling agent to gel test solvent at 77° F., is worthless as a gelling agent since it does not produce a gel in one week. However, when these basic aluminum dialkanoates are coprecipitated the mixed-radical product gels test solvent at 2% concentration in about 12 minutes and at 4% concentration a gel is produced in 6 seconds. Thus the basic aluminum soap must contain available branched chain alkanoate radicals of more than one carbon chain configuration. The results obtained with basic aluminum 2-ethylhexanoate and basic aluminum 3,5,5-trimethylhexanoate soaps are shown in Table 10 below. The 2-ethylhexanoate radicals may be added in amounts to supply up to about 50%, preferably from about 10% to about 50% of the total branched chain alkanoate radicals in the finished gelling agent. Likewise, the 8 carbon atom homolog of basic aluminum 3,5,5-trimethylhexanoate, that is, basic aluminum 2,4,4-trimethylpentanoate, otherwise designated as basic aluminum α-neopentylpropionate, when used alone, does not gel test solvent in one week but when the α-neopentylpropionic acid was blended to obtain a mixture containing this acid and 2-ethylhexanoic acid the basic aluminum alkanoate soap derived therefrom gelled test solvent in 31 minutes at 4% concentration.

The multiplicity of isomers present in olefin polymer product containing from 7 to 12 carbon atoms per molecule derivable from propylene, butenes, and mixtures of these makes impossible a close approximation of the composition of either the olefin polymers or the basic aluminum branched chain alkanoates derived therefrom. Even the heptene olefin fraction contains many C7 isomers and the number of isomers increases very markedly as the molecular weight of the polymer is increased. The proximate analysis of C3=—C4= copolymer heptenes is given in Table 3 below.

The estimated branching in oxo acids, i. e., isoalkanoic acids prepared from olefins as described above and containing 8, 9, 10, and 13 carbon atoms, is given in Table 1 below. The physical properties of these acids, which were obtained by springing the aqueous solution of the corresponding sodium isoalkanoate soaps with dilute sulfuric acid to obtain acids, are given in Table 2 below. Infrared spectrum analyses were made of the acids shown in Table 2 and these analyses verified the preponderance of methyl branches, average number of branches per molecule and relatively low proportion of α carbon atom branching in these acids.

TABLE 1

*Probable branching in oxo acids*

| Acid | C8 | C9 | | C10 | C13 | | |
|---|---|---|---|---|---|---|---|
| Source | C3=+C4= Copolymer | C4= Codimer | Diiso-butylene | C3= Trimer | C3= Tetramer | C4= Cotrimer | Tri-iso-butylene |
| Molecules containing Me-branches, percent | 94 | 100 | 100 | 100 | 100 | 100 | 100 |
| Molecules containing Et-branches, percent | 12 | 2.5 | 0 | 12.5 | 12 | 15 | 0 |
| Molecules containing nPr-branches, percent | 0 | 0 | 0 | 9 | 8 | 0 | 0 |
| Average No. branches per molecule | 1.67 | 2.89 | 3.0 | 2.47 | 3.41 | 4.54 | 5.90 |
| Average No. Me branches per molecule | 1.55 | 2.86 | 3.0 | 2.25 | 3.13 | 4.39 | 5.90 |
| Percent Me branches in total branches | 93 | 99 | 100 | 91 | 92 | 97 | 100 |
| Molecules containing α-branching, percent: | | | | | | | |
| α-Methyl | 7 | 3 | 0 | 10 | 7 | 4 | 0 |
| α-Ethyl | 1 | 2 | 0 | 4 | 4 | 0 | 0 |
| Total | 8 | 5 | 0 | 14 | 11 | 4 | 0 |
| Distribution based on total no. branches, mol percent: | | | | | | | |
| 1 branch | 33 | 1 | | | | | |
| 2 branch | 67 | 14 | | 56 | 59 | | |
| 3 branch | | 80 | 100 | 41 | 41 | 46 | |
| 4 branch | | 5 | | 3 | | 54 | 10 |
| 5 branch | | | | | | | 90 |
| 6 branch | | | | | | | |
| Total | 100 | 100 | 100 | 100 | 100 | 100 | 100 |

TABLE 2

*Physical properties of oxo acids obtained from polymers of C3= and C4=*

| | Distillation | | | Spec. Gr. at 60° F. | Refractive Index, $n_D^{20}$ | Neutralization No. | Apparent Mol Wt. | Theoretical Mol Wt. | Acidity [4] |
|---|---|---|---|---|---|---|---|---|---|
| | Overhead Temp.,°F | Pressure, mm. | Reflux Ratio | | | | | | |
| C8 | 240–260 | 10–14 | 2:1 | 0.9183 | 1.4292 | 389 | 144.9 | 144.2 | 99.5 |
| C9[1] | 450–500 | (ASTM Atmospheric) | | 0.9210 | 1.4370 | 352.2 | 159.2 | 158.2 | 99.4 |
| C9[2] | 256–263 | 11–12 | 6:1 | .9039 | 1.4300 | 359 | 158.2 | 158.2 | 100.0 |
| C10 | 283–295 | 10–11 | 7:1 | 0.9090 | 1.4374 | 328.2 | 171.9 | 172.3 | 100.2 |
| C13[3] | 305–341 | 5–10 | 7:1 | 0.9021 | 1.4459 | 261.2 | 215.4 | 214.3 | 99.5 |

[1] Sprung from caustic oxidized isononanol derived from C4= codimer by oxoation.
[2] Sprung from caustic oxidized isononanol derived from diisobutylene by oxoation.
[3] Sprung from caustic oxidized isotridecanol derived from propylene tetramer by oxoation.
[4] Calculated as indicated acid.

Referring to Table 1, it is noted that, with the exception of isooctanoic acid, 100% of the molecules of the acid mixtures, and hence the soaps derived therefrom, are characterized by having methyl branching in all of the radicals and 94% of the isooctanoic acid molecules contain methyl branched acid radicals. The percent of molecules containing ethyl branches in the acid radicals is low for all of the acids and likewise the percent of α branching is relatively low in the radicals of all of the branched chain isoalkanoic acids. The percent of total branches represented by methyl groups is very high being above about 90% for all of the oxo acids. The average number of methyl branches per molecule varies from 1.55 for the isooctanoic acid mixture to 3.13 for the isotridecanoic acid mixture derived from C₃=tetramer by oxoation and caustic oxidation and to 5.9 for isotridecanoic acid mixture so derived from triisobutylene. The degree of branching varies within the mixture of oxo acids having the same number of carbon atoms except in the C₉ oxo acid derived from diisobutylene which is not a mixture of C₉ acids but is substantially pure 3,5,5-trimethylhexanoic acid. The number of branches per acid radical in the acids varies from 1 in approximately one-third of the molecules of the mixed isooctanoic acids to 6 in 90% of the molecules of mixed tridecanoic acid derived from triisobutylene.

Although, as indicated above, the multiplicity of isomers present in the primary intermediate olefin polymer product makes impossible a close approximation of the composition of all of the olefin polymers having 7 to 12 carbon atoms or the basic aluminum alkanoates derived therefrom, we have determined the probable composition of the branched chain heptenes of the isooctanols and hence the isooctanoates derived therefrom. A rough C₇ fraction of a typical polymer obtained by polymerizing C₃=+C₄= stream at a temperature of about 385° F. and a pressure of 1200 p. s. i. in the presence of solid phosphoric acid catalyst was examined. Conversion under these conditions was 93%. A rough C₇ fraction was found to contain 1% hexenes, 89% heptenes, and 10% octenes. This cut was refractionated to eliminate hexenes and octenes. Based upon a true boiling point curve and refractive index data of the mixture of C₇ olefins and similar data on the paraffins obtained in the course of oxoation of this C₇ olefin the composition of the C₇ olefins was determined to be as shown in Table 3.

TABLE 3

Olefin composition: C₇ oxoation feed

| Feed, Parts/1,000 | Component | Type |
|---|---|---|
| 12 | 3,3 DMP-1 | G |
|  | 4,4 DMP-2 | G |
| 24 | 2,2 DMP | F |
|  | 2,4 DMP | E |
| 47 | 3,4 DMP-1 | B |
|  | 2,4 DMP-1 | E |
| 165 | 2,4 DMP-2 | E |
|  | 2,3 DMP-1 | B |
|  | 3,4 DMP-2 | B |
| 106 | 4 MH-2 | C |
|  | 2 MH-3 | A |
| 70 | 4 MH-1 | C |
| 70 | 3 M 2EB-1 | B |
|  | 2 MH-1 | A |
|  | 3 EP-2 | D |
| 259 | 2 EP-1 | C |
|  | 3 MH-2 | C |
|  | 3 MH-3 | C |
| 247 | 2 MH-2 | A |
|  | 2,3 DMP-2 | B |

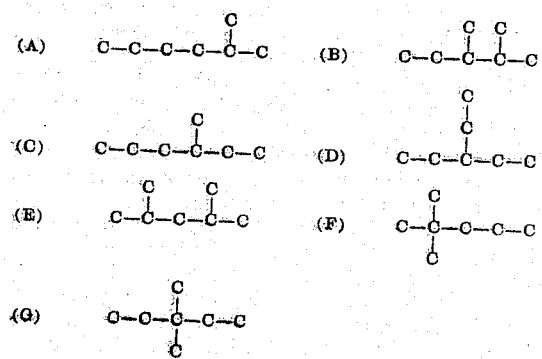

The above shows the absence of n-heptenes in the C₇ olefin polymer fraction. The generally accepted mechanism of propylene-butylene polymerization in the presence of acid type catalyst is in accord with the conclusion that essentially no straight chain, i. e., n-heptene, would be formed. We found less than about 1.0 percent normal heptenes in the C₇ olefin fraction which was subjected to the oxoation process as primary intermediate to obtain branched chain octanals and branched chain octanols. This was determined by converting the heptene fraction to a corresponding heptane fraction by hydrogenation. Superfractionation of the hydrogenated heptene fraction at 200 to 1 reflux ratio in a column equivalent to 150–200 theoretical plates produced no hint of a plateau at the boiling point horizon of normal heptane and the refractive index of a cut taken at the n-heptane boiling point horizon was very remote from the index of refraction of n-heptane. This cut indicated, in infrared analysis, the presence of less than 1.0 percent n-heptane in the hydrogenated heptene fraction. However, not more than 25 percent to 30 percent of the possible 1.0 percent n-heptenes would oxoate to produce 2-ethylhexanal which upon hydrogenation would produce 2-ethylhexanol. Thus there is less than about 0.3 percent 2-ethylhexanoic acid in the mixture of branched chain octanoic acids produced from the heptene copolymer intermediate.

A mixture of octanols derived from the above described heptenes was esterified. The esters were decarboxylated thermally to produce a mixture of octenes having terminal bonds, which octenes had a skeletal structure corresponding to the octanols before esterification. Oxo octanols derived from another mixture of heptenes were converted to the corresponding octanoates by high temperature caustic oxidation. The octanoic acids were obtained from the octanoates and insofar as boiling point and refractometry measurements permitted the isomer distribution was determined. Taking into consideration the proximate analyses obtained by the above procedures and the theoretical course of the oxoation of the heptenes described above, it was concluded that the probable composition of the octanols derived from the above described heptenes is as set out in Table 4.

TABLE 4

Probable composition of isooctanol

| Isomer | Probable Composition, Percent |
|---|---|
| 3,4-dimethylhexanol | 22 |
| 4,5-dimethylhexanol | 20 |
| 3,5-dimethylhexanol | 11 |
| 4-methylheptanol | 10 |
| 3-methylheptanol | 6 |
| 5-methylheptanol | 6 |
| 4-ethylhexanol | 6 |
| 6-methylheptanol | 6 |
| 3-ethyl-4-methylpentanol | 5 |
| 2,4-dimethylhexanol | 5 |
| 2,5-dimethylhexanol | 4 |
| 2-ethyl-4-methylpentanol | 3 |
| 4,4-dimethylhexanol | 1 |
| 5,5-dimethylhexanol | 0.5 |
|  | 0.5 |

No evidence of isopropyl substituent groups in the purified oxo alcohols was found although oxoation of 2-methylhexene-3 should produce, by oxoation and hydrogenation, 2-isopropylpentanol along with 2-ethyl-4-methylpentanol. Likewise, oxoation of 2-methylhexene-2 followed by hydrogenation should yield 2-isopropylpentanol exclusively in the absence of ethylenic linkage isomerization. In like manner oxoation of 2,4-dimethylpentene-2 followed by hydrogenation of the oxoated product should yield 2-isopropyl-3-methylbutanol but with shift of the ethylenic linkage to the 1-position the alcohol product would be 3,5-dimethylhexanol. This branched chain alcohol is present in considerable quantity in the purified isooctanol mixture. Other evidence supports the conclusion that there is extensive isomerization of ethylenic linkage of the olefins in the oxo reaction.

There is less than about 0.3 percent of 2-ethylhexanol in the purified oxo alcohols. This is explained on the basis that this octanol is derived from only normal straight chain heptenes and, is stated above, the heptene polymer mixture contains less than about 1.0 normal straight chain heptenes and hence the isooctanols contain less than about 0.3 percent 2-ethylhexanol.

Examination of Table 4 indicates that at least 90 percent of the total isomeric octanols in the purified oxo alcohol are methyl substituted of which at least 50 percent are dimethylhexanols and not more than 12 percent of the isooctanols are ethyl substituted, and the isooctanols contain less than about 0.3 percent 2-ethylhexanol. Thus, for purpose of definition in this specification and the claims supported thereby, we use the term isooctanoate to designate the product consisting of mixed branched chain isomeric octanoates which are derived from the isomeric octanols, that is, the purified octanol fraction by caustic fusion and the basic aluminum isooctanoate is defined as the basic aluminum soap of isomeric branched chain octanoic acids, which acids are at least 90 percent methyl substituted, of which at least 50 percent are dimethylhexanoic acids and which acids are not more than about 12 percent ethyl substituted and contain less than about 0.3 percent of 2-ethylhexanoic acids, said isomeric branched chain isooctanoic acids being further characterized by having not more than 7 and not less than 5 carbon atoms in a straight chain.

In our preferred procedure, the precipitated basic aluminum soap is dehydrated until the moisture content is between about 1.0 and 1.3%. This is accomplished by heating at a temperature of about 140° F. for about 18 hours. The so-dried soap is then ground to suitable particle size and during the grinding operation the moisture content is further reduced to about 0.6 to 1.0%. Following the initial drying step and the grinding operation, the finely divided soap is heated again and at a substantially higher temperature, e. g., for a period of about 3 hours at a temperature of about 210° F., during which period the moisture content of the soap is reduced to about 0.2 to 0.5%. However, the partially dried, washed precipitated soaps may be rough ground to about 4 mesh size particles and subjected to further drying at temperatures below about 220° F. to reduce the moisture content to less than about 0.6% in a single drying step and then the soap is ground to pass through a #40 U. S. Standard sieve, preferably a major portion of the dried agent to pass through a #100 U. S. Standard sieve. With respect to the defined drying technique, this application is a continuation-in-part of copending application Serial 322,602, filed November 26, 1952, and now abandoned.

In determining the moisture content of the aluminum soaps, we employ the benzene azeotrope method. This method is essentially the ASTM method D–95–46. However, we employ a 1 liter flask heated by an electrical heating mantle and 500 milliliters of benzene is used as a solvent.

The branched chain alkanoate soaps prepared according to the above procedure produce stable gels and are highly insensitive to atmospheric moisture. As indicated in tables below we have checked the moisture sensitivity by subjecting the dehydrated soaps to atmospheric conditions of 80 percent relative humidity at 80° F. In this test the soap, dispersed in thin layers, is subjected to the humid atmosphere for periods of one-quarter hour. Such exposure markedly increases the moisture content of the soap and generally increases the gelation rate of the novel soap without affecting appreciably the viscosity or stability of the gels produced therefrom. This is particularly advantageous since the aluminum soaps are often subjected to high humidity conditions during storage. The characteristic property of these novel aluminum soap gelling agents of acquiring accelerated gelation rate without affecting the viscosity and stability characteristics of hydrocarbon gels produced by the aluminum soap gelling agent is not common to aluminum soap gelling agents in general. Thus Napalm is adversely affected by exposure to a highly humid atmosphere, hydrocarbon gels produced from Napalm, so exposed, exhibiting lower initial viscosity and in general, much less stable hydrocarbon gels.

For the same particle size, our gelling agents have a bulk density from 2 to 3 times the bulk density of certain other basic aluminum alkanoates. Thus, more of our aluminum soap gelling agents can be shipped and stored per unit volume of container. This is shown in the data in Table 5 following.

TABLE 5

*Physical characteristics of aluminum soaps*

| Basic Aluminum Soap | Bulk Density, gm./ml. | Particle Size, Wt. Percent Through 100 mesh |
| --- | --- | --- |
| Isooctanoate | 0.51 | 100 |
| Isononanoate (from $C_4$=Codimer) | 0.48 | 100 |
| Isononanoate (from diisobutylene) | 0.19 | 100 |
| Isotridecanoate (from $C_3$=tetramer) | 0.48 | 100 |
| Coprecipitated 25% iso $C_8$–75% $C_{13}$ | 0.52 | 100 |
| Coprecipitated 50% iso $C_8$–50% $C_{13}$ | 0.56 | 100 |
| 2-ethylhexanoate | 0.18 | 100 |
| Caprylate | 0.15 | 100 |

The preparation of highly methyl branched sodium octanoate, that is, sodium isooctanoate intermediate and the preparation of a mixture of branched chain basic aluminum diisooctanoate gelling agent is described in Example I below. The method described is applicable to the preparation of the sodium alkanoates and basic aluminum alkanoates of analogous nonanoate soap mixtures, decanoate soap mixtures, undecanoate soap mixtures, dodecanoate soap mixtures, and tridecanoate soap mixtures.

EXAMPLE I

A solution of 74.0 wt. percent of rayon grade sodium hydroxide was preheated and pumped at an average rate of 4.5 pounds per hour into the bottom of a cylindrical reaction vessel at about 685° F. The reactor was fitted with a stirrer and baffles to provide agitation. An oxo process isooctyl alcohol mixture (B. P. 181° C.–192.5° C., $N_D^{20}$ 1.4305, Sp. Gr. 0.833) that is, a mixture of isooctanols, preheated to about 685° F. was pumped into the bottom of the reactor through a separate inlet at an average rate of 9.3 pounds per hour, reactor temperature being maintained at about 720° F. Oxidation of the alcohol took place with evolution of hydrogen at the rate of about 55 cubic feet per hour (measured at standard conditions of temperature and pressure). This gas was vented at such a rate as to maintain a pressure of about 210 p. s. i. g. on the reactor and solution vessel. The mixture of isomeric sodium octanoates, excess sodium hydroxide and trace of unreacted alcohol passed through an overflow line at the top of the reactor into a solution vessel held at a temperature of about 410° F. where water was added at the rate of about 29 pounds per hour to dissolve the soap and excess caustic. Unrecated isooctanols were flashed off with steam from the top of the solution vessel to a separator where it was recovered at a rate of about 0.3 pound per hour. Over a twenty-one hour period, 194.8 pounds of the isooctanol was fed to the reactor and there was recovered sodium isooctanoate soap, equivalent to 187.9 pounds of isooctanols corresponding to a yield of 96.2 percent, along with 6.9 pounds of unconverted isooctanols. An aqueous soap solution was withdrawn from the bottom of the solution vessel and cooled. This solution had an average analysis corresponding to the following:

| | Wt. percent |
|---|---|
| Sodium isooctanoate | 45.8 |
| Water | 51.7 |
| Sodium hydroxide | 2.0 |
| Sodium carbonate | 0.5 |
| Free isooctanol | Trace |
| | 100.0 |

The preparation of methyl branched basic aluminum isoalkanoate gelling agent is exemplified by the description hereinbelow of the preparation of basic aluminum isooctanoate from the sodium isooctanoate so produced. In a commercially operated process 110 pounds of 47.8 percent solution of NaOH was added to 6780 pounds of water in a precipitation vessel. To this alkali solution was added 2000 pounds of isooctanoate solution containing 878 pounds of sodium isooctanoate, prepared as described above, and containing 53.4 pounds of free NaOH. While agitating this solution, 2944 pounds of aluminum chloride solution containing 460 pounds of aluminum chloride was added. The precipitated basic aluminum isooctanoate was filtered, washed free of chloride, rough ground and dried for 18 hours at 140° F. to 150° F. and then further dried for three hours at 210° F. to 212° F. The dried basic aluminum isooctanoate was ground in a hammer mill to fineness corresponding to about 75 percent passing through a number 100 screen.

The preparation of a coprecipitated mixed basic aluminum dioctanoate soap from sodium 2-ethylhexanoate and methyl branched sodium isooctanoate produced in Example I is described in Example II. The precipitated mixture contained about 53.5% 2-ethylhexanoate octanoate radicals and about 46.5% of predominantly methyl branched isooctanoate radicals. The description of the preparation of physical mixture blends is given in Example III below.

EXAMPLE II

*Basic aluminum octanoate gelling agent*

Coprecipitated basic aluminum octanoate soap containing 2-ethylhexanoate radicals and isooctanoate radicals was prepared from the product obtained in Example I and commercial grade 2-ethylhexanoic acid according to the following procedure:

To 2100 ml. of water in a stirred mixer was added 51.2 grams (1.28 mols) of sodium hydroxide and 100 grams (0.69 mol) of 2-ethylhexanoic acid and 218.3 grams of 45.8 percent aqueous solution of sodium isooctanoate prepared in Example I. The final solution of branched chain sodium octanoates had a pH of about 14 and contained about 0.69 mol of 2-ethylhexanoate radicals, about 0.60 mol of isooctanoate radicals and about 0.70 mol, that is, 52.6 precent excess of sodium hydroxide. A solution prepared from 300 ml. of 32° Be. technical AlCl₃ solution (28.4 wt. percent AlCl₃ or 51.4 wt. percent AlCl₃·6H₂O) and 610 ml. of water were added to the stirred alkaline solution over a period of about 30 minutes. Precipitation of the aluminum soap started at about pH 9.5 and the pH had dropped to about 3.0 when addition was completed. After stirring an additional 15 minutes, the water was decanted and the precipitated aluminum soap was washed by five redispersions and decantations. The soap was finally transferred to a Buchner filter and washed with water until the washings were essentially free of chloride ion as indicated by silver nitrate solution.

The aluminum soap was dried on the filter for about two hours, broken up into small particles and dried in a convection-type oven at 125°–140° F. for 18 hours. The yield was 202 grams, that is, 0.612 mol corresponding to 94.5 percent of theoretical for a product corresponding to AlOH (C₇H₁₅COO)₂. The soap was ground in the presence of about 1 percent of silica aerogel in a Mikro-Pulverizer and finally redried for three hours at 200°–212° F. The bulk density of the powdered soap, less than 100 mesh, was 0.35 gm./ml.

Coprecipitation of basic aluminum octanoates containing branched chain isooctanoate radicals and 2-ethylhexanoate radicals in ratios of about 20 to 80 and 80 to 20 percent respectively of the total octanoate radicals in said basic octanoates were also prepared according to the procedure described in Example II. The results obtained in gelling hydrocarbons using our coprecipated basic aluminum octanoates are shown in Table 9 below. The sample of basic aluminum isooctanoate shown in Table 9 was prepared from the soap prepared as described in Example I and in the same manner as the coprecipitated basic aluminum octanoates described in Example II except that no 2-ethylhexanoate radicals were precipitated with the isooctanoate radicals in preparing the precipitated mixture of basic aluminum isooctanoate soap.

EXAMPLE III

*Physical blend of isooctanoate with 2-ethylhexanoate*

Physical blending of the aluminum soap prepared in Example I with an equal weight of commercial grade basic aluminum 2-ethylhexanoate powder to prepare the gelled test solvent described in Table 9 was accomplished by shaking equal weights of the two components to obtain a uniformly mixed gelling agent. In addition, test solvent gels were prepared from the samples of the same basic aluminum 2-ethylhexanoate per se and the same basic aluminum isooctanoate per se. The results of the tests to which these gels were subjected are shown in Table 9.

EXAMPLE IV

*Preparation of basic aluminum tridecanoate*

A basic aqueous solution containing 37.4 parts by weight of sodium hydroxide, 431 parts by weight of sodium hydroxide, 431 parts by weight of sodium isotridecanoate obtained by caustic fusion of isotridecanol derived by oxoation of propylene tetramer, and 4400 parts by weight of water was prepared. To this solution was added, with stirring, 448 parts by weight of 32° Be. aluminum chloride solution in 827 parts of water whereupon the basic aluminum isotridecanoate precipitated. The solution was redispersed three times in water and then collected on a filter. It was washed essentially free of chloride ion and crumbled and dried in an oven for 18 hours at 140° F. The dried aluminum soap was mixed with 1 weight percent of silica aerogel as an antiagglomerant and ground to powder particles less than 100 mesh and a part of the powdered gelling agent was further heated for three hours at 212° F. Samples of basic aluminum isotridecanoate were made in similar manner except that aluminum sulfate was used as the precipitant. Samples of basic aluminum isononanoate, and basic aluminum decanoate, were also prepared according to the above procedure from the corresponding sodium soaps obtained by caustic fusion of the isoalkanols derived respectively from C₄=codimer and C₃=trimer by oxoation and hydrogenation of the oxoated polymer as described above.

In using the gelling agents produced according to the foregoing procedure, a quantity of the agent is added to an organic liquid such as gasoline or a hydrocarbon distillate fuel and stirred at ambient temperatures. Between about 0.5 and about 10% by weight, preferably between 2 and 4% by weight of our mixed basic aluminum diisooctanoates produces the desired gel and, in general, from about 0.5% by weight to about 6% by weight of basic aluminum diisoalkanoates having from 8 to 13 carbon atoms per isoalkanoate radical in said soaps produce relatively stable gels in short periods of time when agitated with liquid hydrocarbons.

Gelation begins immediatley for our gelling agents when the agent and liquid are stirred at ambient temperatures of between about 30° F. and 100° F., and the rate of gelation depends on the factors of temperature, degree of agitation, concentration and inherent gelling property of the agent. The rate of gelation is determined by a standard test described hereinafter which is in terms of the "vortex time," i. e., the time necessary to obtain a specific diminution in the amplitude of a vortex in a mass stirred under defined conditions. This "vortex time" is a measure of the rate at which a gelling agent causes a hydrocarbon solvent to thicken. A vortex time of about 10 minutes or less indicates for most purposes a satisfactory gelation rate.

For general laboratory testing of gelling agents a quantity of the hydrocarbon solvent is introduced into a square-type Mason jar having dimensions approximating 3 inches by 3 inches by 5 inches deep. A total weight of 200 grams of solvent and gelling agent is employed. For example, if 4 weight per cent gel is to be prepared, 8 grams of the gelling agent will be added to 192 grams of the solvent.

A glass stirring rod is employed which is about 3/8 inch in diameter with 4 vanes, 7/8 by 7/8 by 1/8 inch, set at right angles and with faces parallel to the axis of the rod. The stirrer is mounted within the jar with the bottom of the stirrer 1/2 inch above the bottom of the jar. A reference mark is made on the glass rod 1.0 cm. below the surface of the test solvent.

The stirring speed is adjusted to 300±10 R. P. M. and the temperature of the solution is controlled at some standardized temperature. For example, 77° F. was used in our work. The time elapsed between the addition of the gelling agent sample and the covering of the reference mark on the rod by the rising vortex is recorded as the "vortex time." The gel continues to cure for from 6 hours to about one day without stirring after the initial gelation occurs, as measured by the "vortex time."

The properties of the final gel are measured by the "Gardner load," which is a measure of viscosity and indicates the consistency and stability of a cured gel. It is determined in a Gardner Mobilometer, an apparatus described in "Physical and Chemical Examination of Paints, Varnishes, Lacquers and Colors," 10th edition (May 1946) by Henry A. Gardner and G. G. Sward, which is distributed by Henry A. Gardner Laboratory, Inc., Bethesda, Maryland.

The test is made ordinarily at 24 or 48 hours and/or at 168 hours after the initial gelling has taken place and the values are in terms of grams per 100 seconds. A gel exhibiting a Gardner load in the range of about 80 to 225 grams per 100 seconds is generally considered a desirable consistency for use in portable flame thrower service, and somewhat higher consistency gels are more desirable for mechanical flame thrower service. A weight of 350 to 650 grams/100 seconds indicates a suitable consistency for fire bomb service and other military incendiary service. Ordinarily a gelled hydrocarbon mixture should exhibit a weight below about 650 grams if the gel is to have the desired splattering, cohesion and burning properties.

The instrument used in our tests consists essentially of a cylinder supported by a base plate, a plunger or piston, and a collar to support the plunger. The cylinder is 8.0 inches deep and 1.538 inches in diameter. The plunger consists of a disc 1.500 inches in diameter with four perforations 0.250 inch in diameter and a weight pan or holder supported by the upper end of a tube or rod and fixed at its lower end to the disc. The weight of the moving system which includes the disc, the connecting rod or tube, and the weight support is 100 grams.

To make the test, the cylinder is filled to a depth of 20 cm. with the gel to be tested and is leveled by means of adjusting screws. The disc end of the plunger is then introduced into the cylinder with the connecting tube aligned by a collar. The time required for two marks 10 cm. apart on the stem of the plunger to pass through the collar is then recorded. The pair of marks are ordinarily located so that they pass through the collar of the bracket as the disc passes through the mid-portion of the cylinder. Thus the plunger is in motion both at the beginning and at the end of the test interval.

In reporting results, the "Gardner load" is determined by noting two successive loads in grams for more than and less than 100 seconds travel. The load required to give a time of fall of 100 seconds is obtained by linear interpolation from the two readings.

It is not known whether all the advantages of our mixed aluminum isoalkanoates are due to the configuration of the organic groups or due, in certian cases, to its physical state resulting from the particular method of preparation. However, without being limited to any particular theory it is believed that some advantages follow from the highly branched configuration of the organic groups while other advantages are related to the method of preparation. In any event, the properties of the composition are strikingly different from the properties of previously known individual aluminum alkanoates.

The formulation of the standard "test solvent" used in evaluating the gelling agents conforms to the Military Standard MS–602 (October 2, 1951) and has the following composition:

| | Weight percent |
|---|---|
| N-heptane | 57.0 |
| Benzene | 18.0 |
| Cyclohexane | 20.0 |
| Isooctane | 5.0 |

The results of the comparisons with this solvent are set forth in Tables 6, 8–10, 12 and 13.

Referring to Table 6, it will be noted that on the basis of "vortex time" and "Gardner load" only the aluminum isoalkanoates produced according to our invention from mixed branched chain olefin polymers were suitable gelling agents, and of these the aluminum nonanoate derived from diisobutylene were unsatisfactory when used per se, affording only branched chain 3,5,5-trimethylhexanoate radicals. The basic aluminum 2-ethylhexanoate gelling agent is unsatisfactory for the production of gels of relatively low consistency because of the extremely low gelation rate at low percentage concentration and at higher concentrations the gels produced are of too high a consistency when using the 2-ethylhexanoate gelling agent. The basic aluminum capyrlate gelling agent is unsatisfactory because of the instability of low consistency gels produced therefrom. No gels could be produced using basic aluminum dilaurate or basic aluminum myristate under the conditions of the test.

Our aluminum isoalkanoafes are effective as gelling agents in numerous organic solvents and hydrocarbon liquids in which the known aluminum octanoates such as basic aluminum 2-ethylhexanoate and basic aluminum alpha neopentylpropionate and basic aluminum laurate, and the basic aluminum myristate are not effective. The normally liquid organic materials which may be thickened according to this invention include petroleum hydrocarbons whether or not they contain aromatic and/or isoparaffinic hydrocarbons. Such hydrocarbons include naphthas, motor and aviation gasolines, kerosene, fuel oil, jet fuels, diesel fuels, distillates and pure hydrocarbons such as benzene, toluene, and xylene, and higher boiling hydrocarbon fractions which contain substantial proportions of relatively low boiling hydrocarbons or other organic liquids.

Data are set out in Table 7 wherein the performance of our mixed aluminum isoalkanoates are compared with the performance of "Napalm" [which is described in Ind. Eng. Chem. 38, 8 (August 1946, p. 768–73) and is marketed by the Nuodex Company] and with aluminum 2-ethylhexanoate in gelling hydrocarbon liquids.

TABLE 6

*Gelling action of basic aluminum soaps at 77° F. in standard test solvent*

[Exposed ¼ hour to humidified air—80% at 80° F.]

| Gelling Agent | Vortex Time (min.) | | Gardner Load (g/100 sec.) | | | |
|---|---|---|---|---|---|---|
| | | | At 24 hours | | At 168 hours | |
| | 2% by wt. | 4% by wt. | 2% by wt. | 4% by wt. | 2% by wt. | 4% by wt. |
| Al Isooctanoate | 4.8 | 1.5 | 155 | 415 | 145 | 510 |
| Al Isononanoate [1] | 5.3 | 0.4 | 115 | 330 | 160 | 410 |
| Al Isodecanoate | 5.6 | 0.3 | 115 | 330 | 115 | 400 |
| Al Isotridecanoate | 1.4 | 0.4 | 30 | 130 | 25 | 130 |
| Al 2-Ethylhexanoate | 60 | 14.5 | (4) | 370 | (4) | [3] 440 |
| Al Caprylate | 28 | 4.0 | (4) | 290 | (4) | [3] 430 |
| Al α-Neopentylpropionate. | No gel in 1 week at 4%. | | | | | |
| Al Nonanoate [2] | No gel in 1 week at 4%. | | | | | |
| Al Laurate | No gel in 5 days at 4%. | | | | | |
| Al Myristate | No gel in 5 days at 4%. | | | | | |

[1] Derived from $C_4$=codimer.
[2] Derived from diisobutylene. Product is basic aluminum 3,5,5-trimethylhexanoate.
[3] At 48 hours.
[4] Gel too thin for measurement.

TABLE 7

*Performance of basic aluminum soaps in various hydrocarbon media*

[GELATION AT 77° F.]

| Agent | Hydrocarbon Media | | | | | | | |
|---|---|---|---|---|---|---|---|---|
| | 80 CFR-M Gasoline | | Virgin Blend Jet Fuel | | Diesel Fuel | | Isooctane | |
| | (1) Vortex Time | (2) Gardner Load | (1) Vortex Time | (2) Gardner Load | (1) Vortex Time | (2) Gardner Load | (1) Vortex Time | (2) Gardner Load |
| Al Isooctanoate | 1.0 (3)(4%) | 530 (3)(4%) | 2.8 (3)(4%) | 490 (3)(4%) | 2.3 (3)(4%) | 540 (3)(4%) | 3.7 (3)(4%) | 460 (3)(4%) |
| Al Isotridecanoate | 0.4 (4%) | 135 (4%) | 0.3 (6%) | 490 (6%) | | | 0.3 (6%) | 360 (6%) |
| Al 2-Ethylhexanoate | 19 (4%) | 70 (2%) | 1.8 (2%) | 55 (2%) | (b) (4%) | (a) (4%) | 1.5 (2%) | 30 (2%) |
| "Napalm" | 1.6 (4%) | 695 (4%) | 20.3 (4%) | 280 (4%) | 11.3 (4%) | 365 (4%) | (b) (4%) | (a) (4%) |
| | | 210 (4%) | | | | | (b) (4%) | |

(1) Minutes.
(2) At 24 hours in grams/100 seconds.
(3) Percent by weight.
[a] Gel too thin for measurement.
[b] Does not gel in 40 minutes.

It will be noted that the basic aluminum isooctanoates and basic aluminum isotridecanoate gelling agent produced satisfactory gels with a wide variety of hydrocarbon liquids, whereas the basic aluminum 2-ethylhexanoate and the Napalm were unsatisfactory in some instances. From the data in Table 7, it will be seen that the aluminum 2-ethylhexanoate had a long vortex time and too high a Gardner load in high octane number gasoline and gave no evidence of gel formation after long periods of time when mixed with jet fuels and with diesel fuel, even at 4% concentration and was not particularly effective in the gelation of isooctane. While Napalm produced gels at 4% concentration in most of the hydrocarbon media, it was ineffective in the gelation of isooctane at this concentration. We have also found that the isoalkanoates are superior to Napalm for gelling all of the hydrocarbon media of Table 7 at 35° F.

Our mixed branched chain basic aluminum isoalkanoates exhibit superior gelling properties with reference to various hydrocarbon solvents. Comparative data on our gel and those using the prior art gelling agents are set forth in Figure 1 which includes curves showing viscosity vs. time employing 2% basic aluminum isooctanoates derived from $C_3=\!\!-C_4=$ copolymer according to the method of our invention and 2% basic aluminum 2-ethylhexanoate as gelling agents in various hydrocarbon liquids. Viscosities were determined by means of a Brookfield viscosimeter.

More specifically, curves A, B, and C showing abrupt changes of slope illustrate the results obtained when using 2% basic aluminum isooctanoate prepared according to our invention, and curves D, E, and F in which such abrupt change of viscosity is absent represent attempts to prepare gels with the same organic liquids as used in A, B, and C but employing 2% basic aluminum 2-ethylhexanoate. The isooctanoate soap and 2-ethylhexanoate soap were freshly prepared samples and contained approximately the same amount of moisture and were not exposed to humidified air prior to testing the performance of the soaps. No appreciable change in viscosity occurred in as long as 50 minutes when 2% basic aluminum 2-ethylhexanoate was added to toluene, methyl cyclohexane, or the test solvent, whereas abrupt increase in viscosity indicated incipient gel formation in about 25 to 35 minutes with a 2% basic aluminum isooctanoate soap prepared according to our invention. Thus, as illustrated in Figure 1, it is not possible to obtain satisfactory gels of toluene, methyl cyclohexane, and "test solvent" with the prior art aluminum octanoate soaps, whereas the basic aluminum isooctanoates of our invention forms good gels quickly with these diverse solvents.

A more complete description of the performance of our novel gelling agents is given in Table 8 wherein the vortex time and Gardner load values are shown for the basic aluminum isoalkanoates before and after exposure to humidified air. In general, the stability of the gels produced from the basic aluminum branched chain isoalkanoates are not affected adversely by contact of these gelling agents with high humidity air before use in the gelling of hydrocarbons. Contact of the dry gelling agent with moist air generally causes the vortex time to decrease. This is not objectionable if such exposure does not result in instability of the gels formed by the gelling agent. Gels formed from basic aluminum 2-ethylhexanoate gelling agents are also described in Table 8. It is to be noted that satisfactory gels are obtainable by using as agent, aluminum isooctanoate, aluminum isononanoate (produced from $C_4$=codimer), aluminum isodecanoate, and aluminum isotridecanoate.

Tables 9 and 10 describe the performance of mixtures of our branched chain isooctanoates with basic aluminum 2-ethylhexanoate and with our basic aluminum isotridecanoates. In Table 9, the performance of basic aluminum isooctanoate derived from $C_3$=—$C_4$= copolymer and basic aluminum 2-ethylhexanoate is compared with coprecipitated mixtures of these and physically mixed mixtueres. Also in Table 9, the performance of basic aluminum isotridecanoate derived from propylene tetramer is compared with a physical mixture soap of the isotridecanoate and isooctanoate.

TABLE 8

*Performance of basic aluminum soaps—unexposed and exposed to humidified air*

[Determinations in test solvent at 77° F. Exposure ¼ hour to 80% rel. humidity at 80° F.]

| Agent | Al Isooctanoate | | Al Isononanoate [1] | | Al Isodecanoate [2] | | Al Isotridecanoate [3] | | | Al 2-Ethylhexanoate | |
|---|---|---|---|---|---|---|---|---|---|---|---|
| Soap Concentration, percent by weight | 2 | 4 | 2 | 4 | 2 | 4 | 2 | 4 | 6 | 2 | 4 |
| Moisture Before Exposure, percent by weight | 0.9 | 0.9 | 0.4 | 0.4 | 0.6 | 0.6 | 0.3 | 0.3 | 0.3 | 0.5 | 0.5 |
| Moisture After Exposure for ¼ hr, percent by weight | 1.6 | 1.6 | 1.1 | 1.1 | 1.1 | 1.1 | 0.9 | 0.9 | | 0.9 | 0.9 |
| Vortex Time, min.: | | | | | | | | | | | |
| Unexposed | 20 | 6.3 | 5.9 | 0.4 | 7.2 | 0.7 | 1.0 | 0.3 | 0.2 | 60 | 14.3 |
| Exposed | 4.8 | 1.5 | 5.3 | 0.4 | 5.6 | 0.3 | 1.5 | 0.4 | | 60 | 14.5 |
| Gardner Value, g./100 sec.: | | | | | | | | | | | |
| Unexposed (at 24 hrs.) | 180 | 515 | 140 | 400 | 150 | 360 | 40 | 180 | 385 | (4) | 315 |
| Exposed (at 24 hrs.) | 155 | 415 | 115 | 330 | 115 | 330 | 35 | 140 | | (4) | 370 |
| Unexposed (at 168 hrs.) | 185 | | 185 | 420 | 165 | 390 | 60 | 230 | 430 | | |
| Exposed (at 168 hrs.) | 145 | 510 | 160 | 410 | 115 | 400 | 50 | 170 | | | |

[1] Prepared from $C_4$=codimer as primary intermediate.
[2] Prepared from $C_3$=trimer as primary intermediate.
[3] Prepared from $C_3$=tetramer as primary intermediate.
[4] Gel too thin for measurement.

TABLE 9

*Performance of unexposed mixed basic aluminum branched chain alkanoates in test solvent at 77° F.*

[Percentages by weight]

| Soap | A | A′ | B | B′ | C | Coprecipitated A+B | | | Physically Mixed 50% A′+50% B | Physically Mixed A+C | | |
|---|---|---|---|---|---|---|---|---|---|---|---|---|
| | | | | | | 20% B 80% A | 53.5% B 46.5% A | 80% B 20% A | | 25% A 75% C | 50% A 50% C | 75% A 25% C |
| Moisture, percent | 0.6 | 0.9 | 0.5 | 0.6 | 0.3 | 0.7 | 0.6 | 0.8 | 0.7 | 0.3 | 0.5 | 0. |
| 2% Gels: | | | | | | | | | | | | |
| Vortex Time, min | 24 | 19 | >60 | 120 | 1.6 | 34 | 48 | >60 | 40 | 1.3 | 2.5 | 6.7 |
| Gardner Load, g./100 sec.— | | | | | | | | | | | | |
| at 24 hrs | 210 | 210 | (*) | (*) | 35 | 240 | 290 | 200 | 260 | 40 | 55 | 85 |
| at 168 hrs | 210 | 160 | 115 | 160 | 30 | 220 | 310 | 380 | 240 | 55 | 70 | 110 |
| 4% Gels: | | | | | | | | | | | | |
| Vortex Time, min | 1.5 | 4.5 | 14 | 19 | 0.4 | 3.6 | 3.6 | 6.3 | 5.1 | 0.4 | 0.4 | 0.5 |
| Gardner Load, g./100 sec.— | | | | | | | | | | | | |
| at 24 hrs | 490 | 520 | 270 | 190 | 160 | 500 | 520 | 430 | 550 | 185 | 240 | 350 |
| at 168 hrs | 490 | 465 | 410 | 420 | 170 | 540 | 570 | 530 | 490 | 225 | 300 | 370 |

A and A′—Different samples of basic aluminum isooctanoate derived from $C_3$=-$C_4$=copolymer.
B and B′—Different samples of commercial grade basic aluminum 2-ethylhexanoate.
C—Basic aluminum isotridecanoate derived from propylene tetramer.
* Gel too thin for measurement.

TABLE 10

Performance of mixed basic aluminum branched chain soaps of 2-ethylhexanoic acid and 3,5,5-trimethylhexanoic acid [1] at 77° F.

| | Basic Aluminum 2-Ethylhexanoate-3,5,5-Trimethylhexanoate (50 mol percent-50 mol percent of coprecipitated Mixture) | | | | Basic Aluminum 2-Ethylhexanoate | | | |
|---|---|---|---|---|---|---|---|---|
| Dried, hrs. at Temp., °F | 18 Hours at 140° | | | | 18 Hours at 140° | | | |
| Concentration, percent by weight | 2% | | 4% | | 2% | | 4% | |
| Exposure to 80% R. H. at 80° F., hrs | 0 | ¼ | 0 | ¼ | 0 | ¼ | 0 | ¼ |
| Moisture, percent by weight | 0.7 | 1.5 | 0.7 | 1.5 | 0.5 | 0.9 | 0.5 | 0.9 |
| Vortex Time, min | 12 | 9.1 | 0.3 | 0.3 | 60 | 60 | 14 | 15 |
| Gardner Load, g/100 sec.: | | | | | | | | |
| at 24 hrs | 260 | 270 | 605 | 575 | (²) 115 | (²) 105 | 270 | 320 |
| at 168 hrs | 265 | 240 | 555 | 550 | | | 410 | 430 |
| | Redried Additional 3 Hours 212° F. | | | | | | | |
| Exposure to 80% R. H. at 80° F., hrs | 0 | ¼ | 0 | ¼ | | | | |
| Moisture, percent by weight | 0.5 | 1.1 | 0.5 | 1.1 | | | | |
| Vortex Time, min | 56 | 47 | 0.2 | 0.1 | | | | |
| Gardner Load, g/100 sec.: | | | | | | | | |
| at 24 hrs | 290 | 315 | 560 | 450 | | | | |
| at 168 hrs | 255 | 260 | 510 | 510 | | | | |

[1] Basic aluminum soap of 3,5,5-trimethylhexanoic acid does not gel test solvent at 77° F. when contacted therewith for period of 1 week.
[2] Gel too thin for measurement.

The effect of the isotridecanoate on the isooctanoate is to stabilize the gels formed therefrom against loss of consistency in the presence of casual water. In general when mixtures of isooctanoate and 2-ethylhexanoate soaps are used whether these components be coprecipitated or phsically mixed the Gardner load is higher than for gels made with isooctanoate alone at a given concentration of gelling agent. The vortex time of basic aluminum isooctanoate is decreased by the isotridecanoate whereas the vortex time of the isooctanoate is increased by the presence of 2-ethylhexanoate. Hence, we supply to the complex soap mixture sufficient 2-ethylhexanoate radicals by way of added 2-ethylhexanoate to provide in the finished dry soap less than about 50% of the total alkanoate radicals in said drp soap. Usually, the addition of sufficient sodium 2-ethylhexanoate to the solution from which the aluminum soaps are precipitated to provide from about 10 to about 50% of the alkanoate radicals in the precipitated soap will produce very stable gels from such mixed soaps.

The performance of branched chain basic aluminum soaps of 2-ethylhexanoic acid and 3,5,5-trimethylhexanoic acid derived from diisobutylene is shown in Table 10. Neither of these basic aluminum soaps, if used alone, produce satisfactory gels with hydrocarbons. Thus, basic aluminum 2-ethylhexanoate at 2% concentration requires more than one hour to gel "test solvent" at 77° F. The basic aluminum disoap of 3,5,5-trimethylhexanoic acid does not gel test solvent at 77° F. when contacted therewith in a stirred container for a period of one week. If basic aluminum 2-ethylhexanoate is coprecipitated with basic 3,5,5-trimethylhexanoate in about equal mol ratios for these two components, the gelation rate of the coprecipitated gelling agent at 2% concentration in test solvent is only 12 minutes. Moreover, very stable gels are formed at 2% concentration. At 4% concentration, the coprecipitated non-exposed soap gels test solvent in 0.3 min. and in only 0.1 min., i. e., 6 seconds, if the material is subjected to 80% humidity air at 80° F. for ¼ hour prior to contacting the agent with "test solvent."

The conditions under which mixtures of hydrocarbons such as quartermaster gasoline must be gelled in field service often involves the gelation of gasoline containing suspended water. Most conventional gelation agents fail to produce hydrocarbon gels of acceptable consistency and stability from such mixtures of hydrocarbons. Our basic aluminum isoalkanoates containing 8 to 13 branched chain alkanoate radicals, particularly the basic aluminum isotridecanoate soaps, exhibit the property of producing quite stable gels with quartermaster gasoline associated with casual water. Data obtained in the gelation of quartermaster gasoline associated with 1% water are shown in Table 11.

It is to be noted that the isononanoate soap derived from $C_4=$ codimer, the isodecanoate soap derived from $C_3=$ trimer, and the isotridecanoate soap derived from $C_3=$ tetramer produce gels at 4% concentration in quartermaster gasoline associated with casual water and these gels were stable at consistencies suitable for portable flame thrower service, although gels produced in this medium in the absence of water were of much higher Gardner load value. Coprecipitated isooctanoate and isotridecanoate soaps, the latter component being at relatively high concentration in coprecipitated mixture, also produced gels in the presence of casual water which were stable at consistencies suitable for portable flame thrower service. On the other hand, a mixture of basic isooctanoates alone obtained from $C_3=+C_4=$ copolymer appeared to be less effective for the gelation of quartermaster gasoline associated with casual water. Napalm at 4% concentration gelled the quartermaster gasoline but all gels were broken at 24 and 168 hour inspection periods.

Comparative data showing the improved performance of aluminum isooctanoates prepared according to our preferred drying procedure are presented in Table 12. For use in preparing incendiary gels, an aluminum soap must exhibit a rapid gelling rate and the resultant gel must possess the appropriate consistency; i. e., the vortex time should not be too long and the Gardner load must not be too low. Sensitivity of the aluminum soap to atmospheric moisture should be low; i. e., the Gardner load of a gel prepared from soap that has been exposed to conditions of high humidity should not be substantially less than the load of a gel prepared from dried unexposed soap.

TABLE 11

*Performance of basic aluminum soaps of various acids in quartermaster gasoline associated with casual water*

| Acid | Isooctanoic (X) $C_3=+C_4=$ Polymer | | Isononanoic $C_4=$ Codimer | Isodecanoic $C_5=$ Trimer | | Isotridecanoic (Y) $C_3=$ Tetramer | | Coprecipitated [1] | | | | | |
|---|---|---|---|---|---|---|---|---|---|---|---|---|---|
| Olefin Source | | | | | | | | 25% X 75% Y | | 50% X 50% Y | | 75% X 25% Y | |
| Soap Concen., percent by wt[2] | 2 | | 4 | 4 | | 4 | | 4 | | 4 | | 4 | |
| Soap Bulk Density, g/ml | 0.55 | | 0.48 | | | 0.48 | | 0.52 | | 0.56 | | 0.56 | |
| Solvent (A=QM) (B=QM+1% H₂O) | A | B | A | A | B | A | B | A | B | A | B | A | B |
| Vortex Time, Min | 9.6 | 17 | 2.1 | 0.7 | 0.5 | 1.1 | 1.0 | 7.5 | 4.2 | 11 | 5.4 | 1.2 | 1.1 |
| Gardner Load, g/100 sec.: | | | | | | | | | | | | | |
| After 24 hours | 225 | (3) | 105 | 480 | 65 | 225 | 72 | 530 | 235 | 520 | 130 | 550 | 65 |
| After 48 hours | | (3) | 80 | | 60 | | 68 | | 75 | | 40 | | 20 |
| After 72 hours | | | 75 | 505 | 55 | | | 510 | 55 | 535 | 30 | 530 | 20 |
| After 96 hours | | | 70 | | 50 | | | | 45 | | 25 | | 20 |
| After 168 hours | 220 | (3) | 65 | 350 | 40 | 290 | 55 | 540 | 30 | 490 | 20 | 510 | (3) |

[1] From mixtures of acids at indicated percents by weight.
[2] Samples exposed to 80% R. H. at 80° F. for ¼ hour.
[3] Gel broken.

TABLE 12

*Effect of drying conditions on gel properties of basic aluminum isoalkanoates*

| Soap | Isooctanoate | | | | Isotridecanoate | | | |
|---|---|---|---|---|---|---|---|---|
| Soap, percent by weight | 2 | | | | 4 | | | |
| Initial Drying: | | | | | | | | |
| Time, hours | 18 | | 20 | | 18 | | 18 | |
| Temp., °F | 140 | | 140 | | 140 | | 140 | |
| Moisture, percent by weight | 0.6 | | 0.6 | | | | 0.5 | |
| Final Drying: | | | | | | | | |
| Time, hours | 0 | | 3 | | 0 | | 3 | |
| Temp., °F | | | 212 | | | | 212 | |
| Exposure (80 percent R. H. at 80° F.), hours | 0 | ¼ | 0 | ¼ | 0 | ¼ | 0 | ¼ |
| Final Moisture, percent by weight | 0.6 | 1.5 | 0.3 | 1.2 | 0.5 | 1.6 | 0.3 | 1.9 |
| Gel Performance: | | | | | | | | |
| Vortex Time, min | 10 | 4 | 16 | 13 | 0.3 | 0.5 | 0.3 | 0.4 |
| Gardner Load, g/100 sec. at 24 hrs | 160 | 100 | 210 | 245 | 150 | 105 | 180 | 140 |

Performance data in Table 12 were obtained for gels prepared from test solvent with 2% aluminum isooctanoate and aluminum isotridecanoate at 4% concentration. Different concentrations were used since it requires about 4% concentration of the latter to produce gels of approximate consistency produced by 2% of the isooctanoate soap. The aluminum isooctanoate soap which was dried for a period of 18 hours at 140° F., i. e., not subjected to the final drying step at 212° F., showed a satisfactory vortex time. However, the Gardner load following exposure to humidified air decreased from 160 to 100. Subjecting this soap to a temperature of 212° F. following the 18 hour drying period altered substantially its gelation properties. Thus, the vortex time was increased and the consistency of the gel initially produced from the test solvent was higher. Moreover, the consistency of the gel produced by exposed isooctanoate soap increased, which indicates a higher degree of stability for the gels produced from isooctanoate soap which was given this second drying treatment, although the susceptibility to increase in moisture content of the agent was not affected materially by such secondary drying operation. The properties of the gel produced from the test solvent using the basic aluminum isotridecanoate soap were not affected to as great an extent by varying the drying procedure. Thus, there was very little effect on the vortex time and the final consistency, i. e., Gardner load of gels formed from soap which had been given the dual drying step and then exposure to high humidity was approximately the same as the Gardner load for the unexposed soap which had been given a single drying treatment at 140° F. for a period of 18 hours. In general, the beneficial effect of the two step drying technique decreases as the molecular weights of our basic aluminum alkanoates increase.

As indicated above, in the description of the method of preparing our gelling agents, we have found that a superior gelling agent can be produced from the sodium isooctanoates when we use an aqueous solution of aluminum chloride, as distinguished from aluminum sulfate, in the precipitation of the basic aluminum soap. Comparative data showing the effect of anion of aluminum soap precipitant on the performance of aluminum isoalkanoates is shown in Table 13. The effect of using aluminum sulfate as precipitant on the stability of the gels produced from test solvent when using basic aluminum isooctanoate gelling agent at 2% concentration is poor. Thus, the gelled test solvent prepared from unexposed soap showed a rapid decrease in Gardner number until it became too thin to measure after 168 hours and the effect on Gardner number of the gels when the soap had been exposed to high relative humidity was even more pronounced. However, gels produced from the same soap except that it was precipitated with aluminum chloride rather than of aluminum sulfate showed very little decrease in Gardner load for the unexposed and also for the exposed soap. Thus, soap prepared using aluminum chloride as the precipitant is suitable at 2% concentration for producing gelled hydrocarbons of such stability that they may be used for portable flame thrower service. The advantage of using the chloride instead of the sulfate to precipitate basic aluminum isotridecanoate is not so pronounced where it is desired to obtain stable hydrocarbon gels of a consistency suitable for flame thrower service, that is, at 4% concentration of the gelling agent. Thus, the consistency of the gel even after 168 hours is such as to be suitable for portable flame thrower service whether the sulfate or the chloride be used as precipitant in preparing the basic aluminum isotriodecanoate as gelling agent.

contacted with hydrogen, introduced thereto via line 33, in the presence of a cobalt catalyst to convert the aldehydes in the mixture to alcohols. This is accomplished at conditions of operation taught and claimed in Cerveny U. S. 2,638,488. The hydrogenated product is passed via line 34 to fractionation zone 35 for the isolation of a fraction comprised essentially of a mixture of isooctyl alcohols. Products, lower boiling and higher boiling than the isooctyl alcohol fraction, are passed from zone 35 via lines 36 and 37 respectively and the isooctyl alcohol fraction is passed from zone 35 via line 38 to caustic oxidation feed line 40, valve 39 in line 38 being in the open position.

TABLE 13

*Effect of anion of aluminum salt precipitant on performance of basic aluminum isoalkanoates*

| Soap | Isooctanoate | | Isotridecanoate | | | |
|---|---|---|---|---|---|---|
| Aluminum Salt Anion | Sulfate | | Chloride | | Sulfate | Chloride |
| Exposure, hours (80% R. H. at 80° F.) | 0 | ¼ | 0 | ¼ | 0 | ¼ | 0 | ¼ |
| Moisture in Soap, percent by weight | 0.7 | 1.3 | 0.9 | 1.6 | 1.1 | 1.7 | 0.3 | 1.6 |
| Soap Concentration, percent by weight | 2 | 2 | 2 | 2 | 4 | 4 | 4 | 4 |
| Vortex Time, min | 19 | 12 | 20 | 4.8 | 2.9 | 1.8 | 1.6 | 1.4 |
| Gardner Load, g/100 sec.: | | | | | | | | |
| 24 hours | 185 | 50 | 180 | 155 | 165 | 105 | 160 | 130 |
| 48 hours | 100 | (a) | 200 | 170 | | | | |
| 168 hours | (a) | (a) | 185 | 145 | 195 | 115 | 170 | 130 |

*a* Gel too thin for measurement.

Figure 2:
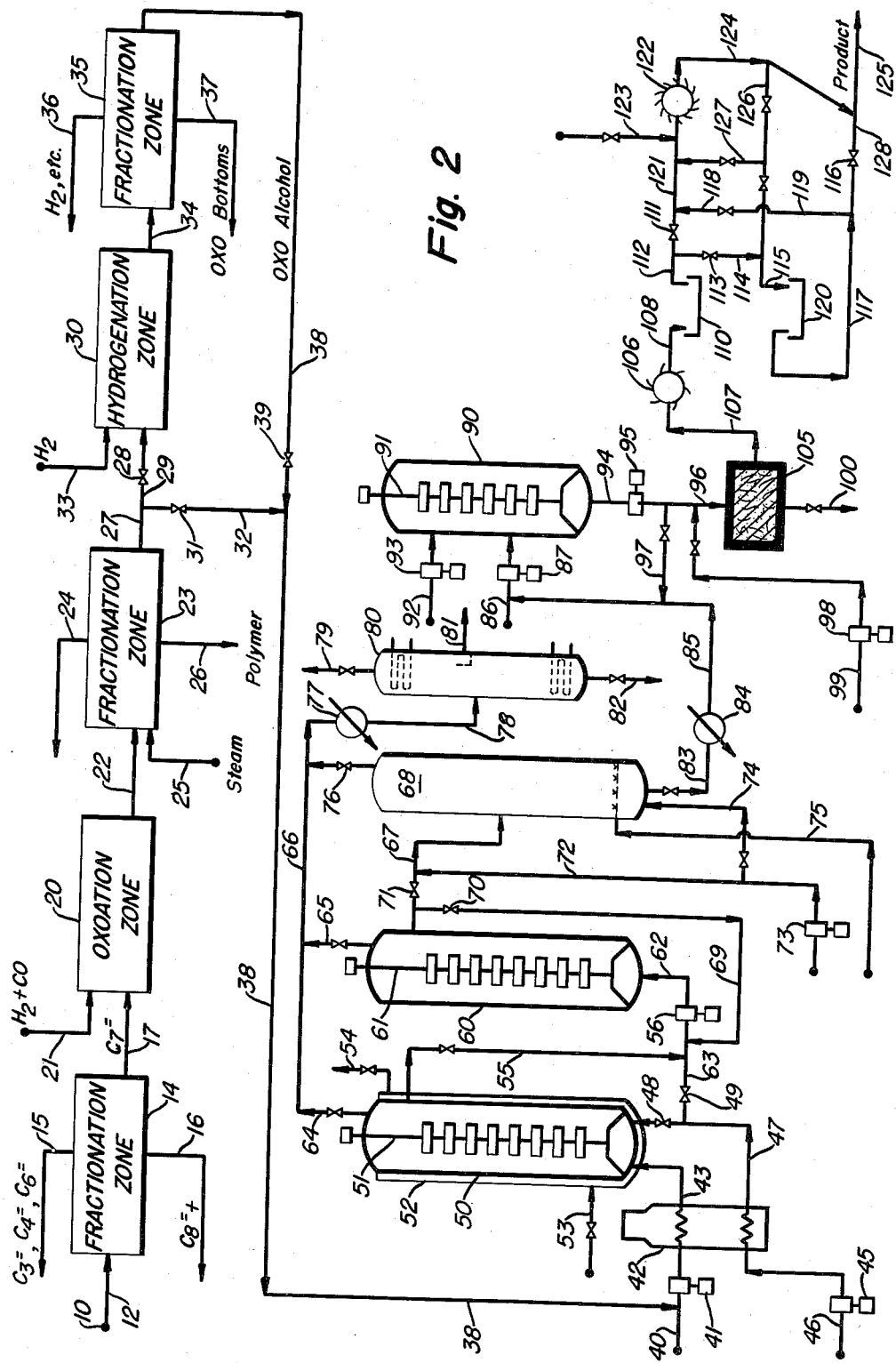

Referring now to Figure 2, which describes specifically one method of producing basic aluminum isooctanoate gelling agent, a polymer gasoline is passed from source 10 through line 12 to fractionation zone 14 for the isolation of a fraction consisting essentially of a mixture of heptenes. Unreacted olefins, including hexene polymer and unreacted lighter olefins, are removed along with saturated normally gaseous hydrocarbons via line 15 and polymer product of higher molecular weight than heptenes is removed from fractionation zone via line 16. The $C_7=$ fraction is passed via line 17 to oxoation zone 20. If desired, the fraction of higher polymer in line 16 may be refractionated to recover polymers containing from 8 to 12 carbon atoms per molecule, which recovered polymers may be added to the heptene fraction passed to oxoation zone 20. Alternately, heavy polymer fraction containing 7 to 12 carbon atoms per molecule may be oxoated either as a whole fraction or as separate fractions in at least one separate oxoation zone and the oxoated product may be oxidized by fusion with alkali metal hydroxide and used as alkali metal isoalkanoate blend with alkali metal isooctanoate in preparing the basic aluminum isoalkanoate according to the process steps described below.

The heptene fraction of polymer is contacted in oxoation zone 20 with hydrogen and carbon monoxide introduced through line 21 in the presence of a cobalt-containing catalyst as described in Russum et al. U. S. 2,638,487.

The oxoated product is passed via line 22 to fractionation zone 23 wherein a $C_8$ alcohol-aldehyde fraction is separated. Unreacted hydrogen and carbon monoxide, if any, and reduced olefin, that is, $C_7$ and $C_8$ paraffins, pass from zone 23 through line 24 along with steam which is introduced to zone 23 via line 25 to aid in removing the $C_8$ oxygenated product from heavier bottom product (designated as "polymer") removed from zone 23 through line 26 and the mixture of $C_8$ alcohols and $C_8$ aldehydes is passed from oxoation zone 23 through line 27 for further processing to the basic aluminum isooctanoate soaps.

As indicated hereinabove, the product in line 27 may be processed to alkali metal isooctanoate intermediate in either or both of two methods. With valve 28 in line 29, which joins line 27, in the open position, the product may be passed to hydrogenation zone 30 wherein it is Alternately, the mixed isoaldehydes and isoalcohols in line 27 may be passed directly to line 40 via lines 32 and 38, valve 28 in line 29 and valve 39 in line 38 being closed, with valve 31 in line 32 being put in the open position.

The isoalkanols obtained as described above from the olefin polymers, e. g., purified isooctyl alcohols, are converted to the sodium soaps of the corresponding acids by fusion with an alkali metal hydroxide, for example, sodium hydroxide, in stirred autoclave type reactors 50 and 60 equipped with stirring means 51 and 61 respectively. Since the reaction of the caustic soda with the alcohols is exothermic, reactor 50 is provided with a water jacket 52 to which water is added through line 53 and from which jacket steam produced therein is released through line 54. The major part of the reaction takes place in reactor 50 and hence reactor 60 is not so equipped. The operation of the caustic oxidation step of our process and the production of basic aluminum isooctanoate soaps is described for a plant producing about 10,000,000 pounds per year of the sodium isooctanoate and about 11,000,000 pounds per year of finished basic aluminum isooctanoates.

Isooctyl alcohol in line 40 is passed at a rate of about 1180 pounds per hour by means of pump 41 to heater 42 wherein it is raised to a temperature within the range of about 675° F. to about 725° F., for example, about 700° F., and it passes through line 43 to reactor 50 at a pressure within the range of from about 175 p. s. i. to 250 p. s. i., for example, 210 p. s. i. About 820 pounds per hour of a 48% caustic soda solution is passed by means of pump 45 in line 46 to heater 42 wherein the temperature is raised to about 700° F. and the caustic solution passes thence through line 47 to reactor 50, valve 48 in line 47 being in the open position and valve 49 being in the closed position. The total caustic added to reactor 50 is sufficient to supply about a 50% excess over that required stoichiometrically to convert the alcohols to soaps of the corresponding acids, that is, in an amount to provide about 1 hydroxyl radical for every two potential octanoate radicals in the reaction mixture. The holding time of the agitated mixture of caustic soda and alcohols in reactor 50 is usually within the range of from about 0.5 to 5.0 hours to give a conversion of about 90% in reactor 50. The reaction product passes from reactor 50 through line 55 and is picked up by pump 56 and passes to reactor 60 through line 62. If desired, additional caustic solution may be introduced via line 63 to facilitate the completion of the conversion to sodium soaps. If the oxoated feed to reactor 50 contains an appreciable content of aldehydes as when the oxoated product has not been reduced to the alcohols in zone 35, reactor 50 is operated at a temperature within the range of from about 500° F. to about 620° F. in the first stage conversion. For this type of operation effluent in line 55 is heated by heater (not shown) before introduction to second stage reactor 60. Reactor 60 is operated at a temperature of about 700° F. and at a pressure of about 210 p. s. i. Overhead gaseous product from reactors 50 and 60 is passed through lines 64 and 65 respectively and by line 66 to fractionator 80, described hereinbelow. This vapor stream contains hydrogen, water, and vaporized unreacted alcohol. The reaction product from reactor 60 passes via line 67 to solution vessel (stripper) 68 wherein unreacted alcohol, hydrogen, and water are removed from the soap product. If desired, at least a part of the effluent in line 67 may be recirculated through recycle line 69, valve 70 in line 69 and valve 71 in line 67 being adjusted to proportion the amount of recycle desired. Generally, a single pass through reactor 60 is sufficient to raise the total conversion to about 95%. Water is introduced to the effluent stream in line 67 through line 72 by means of pump 73 in order to produce a more fluid effluent and if desired water may be added to vessel 68 through line 74. In vessel 68 the soap product is stripped with open steam introduced through line 75, the temperature maintained in the body of the soap being about 410° F. and the pressure in vessel 68 being about 210 p. s. i. Overhead product from vessel 68 containing water and alcohol and a small amount of hydrogen passes through line 76 to line 66 and thence through condenser 77 and line 78 to fractionator 80. From fractionator 80, water and hydrogen pass overhead through line 79 and the separated alcohol is withdrawn from fractionator 80 through line 82. If desired a separation of water and hydrogen can be made in fractionator 80, at least a part of the hydrogen taken overhead through line 79 being recycled as hydrogen feed to hydrogenation zone 30 through line 33, water being withdrawn from tower 80 through side drawoff line 81.

Soap product from stripper 68 is passed via line 83, cooler 84, and lines 85 and 86 by means of pump 87 to aluminum soap precipitation vessel 90. Precipitation vessel 90 is equipped with a mechanically driven stirrer 91 to obtain intimate contact of the sodium soap with the aqueous solution of inorganic aluminum salt, e. g., aluminum chloride, introduced thereto through line 92 by means of pump 93. Precipitation of the basic aluminum soaps is carried out at ambient temperatures, i. e., 70° F. to 110° F. The aluminum soap, slurried in water, is withdrawn from precipitation vessel 90 through line 94 by means of pump 95 and is passed through line 96 to filter 105 which may be of the continuous type such as the Oliver filter. If desired, a part of the effluent in line 94 may be recycled through lines 97, 85, and 86 to vessel 90. The filter cake in filter 105 is washed with the water introduced by means of pump 98 in line 99 through line 96 and the cake is washed until substantially free of chloride (or sulfate) ion. Mother liquor and wash water are removed from filter 105 through line 100.

Partially dry filter cake from filter 105 is picked up by crusher 106 in line 107 and reduced to particle size of about 4 mesh and is passed thence by line 108 to drying pan 110 wherein the basic aluminum isooctanoate soap is dried for a period of about 18 hours at a temperature not exceeding about 150° F. to reduce the moisture content of the soap to less than about 1.5%. At this point, the finishing of the soap may take one of two courses. With valve 111 in line 112 in the closed position and valve 113 in line 114 in the open position, the preliminarily dried soap may be directed through lines 112, 114, and 115 to drying pan 120 wherein the soap is dried to a moisture content of less than about 0.5%. This is accomplished by maintaining the temperature of the soap in the range of from about 200° F. to 220° F. for a period of 3 to 6 hours. With valve 116 in line 117 in the closed position and valve 118 in line 119 in the open position, the dried soap is passed to line 121 and thence to the final grinding operation which is accomplished by means of mill 122 wherein the particle size of the soap is reduced to less than 100 mesh. If desired, an antiagglomerant such as Santocel may be added to the dry soap in line 121 from line 123. The dried, finely ground basic aluminum isooctanoate passes from mill 122 through lines 124 and 125 to product storage. Partially ground soap may be recycled through mill 122 via lines 124, 126, 127, and 121.

In another method, the soap in line 112 coming directly from drying pan 110 may be sent directly to mill 122 for final grinding if the moisture content of the soap is less than about 1.0%, for example, less than about 0.6%, as it passes from drying pan 110, thus eliminating the final drying operation.

In finishing our basic aluminum isooctanoates, we prefer to introduce the final grinding step between the two drying stages. Thus, in such method of operation with valve 113 in line 114 and valve 118 in line 119 in the closed position, basic aluminum soap from initial drying stage is passed via lines 112 and 121 to mill 122 for final grinding prior to final drying and the soap is then directed through lines 124, 126, and 115 to drying pan 120 for final drying to the desired low moisture content following which the dry, pulverized soap product is passed via lines 117, 128, and 125 to product storage.

Although we have described our process as specifically applicable to the production of mixed basic aluminum isooctanoate soaps, the process is also applicable to the production of alkanoates having 9, 10, 11, 12, or 13 carbon atoms per alkanoate radical per molecule of soap. We may also introduce via line 40 alcohols other than oxo alcohols, along with oxo alcohols in order to obtain mixtures of sodium alkanoates with sodium isoalkanoate in the caustic-oxidized product which mixtures when precipitated with aluminum chloride will provide basic aluminum alkanoates, the gelling properties of which are modified by the introduction of such non-oxo alkanoate radicals. The amount of non-oxo alkanols added is limited to such amount as will preserve the preponderance of methyl branches in the finished branched chain alkanoate gelling agent. Thus, we may introduce along with the oxo alcohols in line 40 2-ethylhexyl alcohol in order to obtain a mixture of 2-ethylhexyl radicals and isoalkanoate radicals having from 8 to 13 carbon atoms in the final soap mixture. We may also introduce via line 86 alkali metal soaps containing radicals not found in the isoalkanoate soaps in order to obtain a coprecipitation of these with the isoalkanoate soaps. As in the case of added non-oxo alcohols, the proportion of added non-oxo alkanoates is so limited as to retain a preponderance of methyl branches in the mixture of branched chain alkanoate soaps. Thus highly methyl branched alkanoates derived from hydrocarbon synthesis products in processes using hydrogen and carbon monoxide as feed material, without or with olefins added to such feed in processes other than the so-called oxo-process may be mixed, either physically or by coprecipitation, with our oxo-process product or basic aluminum soaps of these non-oxo process preponderantly methyl branched products may be used as hydrocarbon gelling agents in the absence of our oxo-process basic aluminum soaps produced here described hereinabove. If desired, we may emulsify the sodium soap product in line 85 with a relatively high boiling petroleum oil and precipitate the aluminum soap in the presence of this oil in precipitation vessel 90 as a means of improving the gelation rate of the basic aluminum isoalkanoate soaps.

From the above data and description it will be apparent that we have provided novel gelling agents which are capable of producing with normally liquid hydrocarbons stable gels having consistencies suitable for any military incendiary service.

Although we have described our invention in terms of specific examples which are set forth in considerable detail, it should be understood that these are by way of illustration and that the invention is not limited thereto.

We claim:

1. A composition effective for gelling hydrocarbons boiling in the range of about 100 to 600° F. when employed in either dry or humid atmospheres in amounts of about .5 to 10 per cent by weight, which composition consists essentially of finely ground, free flowing, basic aluminum branched chain alkanoates having two branched chain alkanoate radicals per aluminum atom, said branched chain alkanoate radicals each containing 8 to 9 carbon atoms and said branches being selected from the class consisting of methyl and ethyl, the number of methyl groups in the composition predominating over the number of ethyl groups, at least one radical being present in an amount of about 10 to 50 per cent based on total radicals in the soap mixture, said composition containing less than 1.5 per cent moisture, having a particle size small enough to pass a No. 40 U. S. Standard sieve and having a compact bulk density of about .4 to about .6 gram per milliliter.

2. The composition of claim 1 wherein all the alkanoate radicals contain an equal number of carbon atoms.

3. The composition of claim 2 wherein the alkanoate radicals are branched chain octanoates wherein the octanoate radicals are chiefly methyl heptanoates and dimethyl hexanoates.

4. The composition of claim 1 wherein the alkanoate radicals are substantially entirely 2-ethyl hexanoate and 3,3,5-trimethyl hexanoate radicals wherein the 2-ethyl hexanoate radicals constitute about 10 to 50 per cent of the total alkanoate radicals.

5. The composition of claim 1 which contains about 1 to 2 percent of an aerogel anti-agglomerating agent.

6. A gelling agent for gasolines consisting essentially of basic aluminum branched chain octanoates, about 10% and not more than about 50% of the branched chain octanoate radicals of said basic aluminum octanoates consisting of 2-ethylhexanoate radicals, the other branched chain octanoate radicals of said basic aluminum octanoates consisting essentially of isooctanoate radicals, the major part of the branches of which are methyl branches.

7. The method of making an agent for gelling a hydrocarbon boiling in the range of 100 to 600° F., which method comprises intimately mixing about 1 mol of aluminum chloride with about 2 mols of a dilute aqueous solution of a mixture of sodium branched chain alkanoates and sodium hydroxide in proportions to give a basic aluminum alkanoate soap having two alkanoate radicals per atom of aluminum, the alkanoate radicals being of branched chain structure, each containing 8 to 9 carbon atoms, the branches thereon being selected from the class consisting of methyl and ethyl with the number of methyl groups predominating over the number of ethyl groups, at least one radical being present in an amount of 10 to 50 per cent based on total radicals in the mixture, separating water soluble components from the basic aluminum soap which is precipitated from the aqueous solution, drying said soap to a moisture content of not more than about 1.5 per cent and grinding said soap to a particle size which will pass a No. 40 U. S. Standard sieve.

8. The method of claim 7 wherein the alkanoate radicals are substantially all isooctanoate radicals consisting essentially of methyl heptanoates and dimethyl hexanoates.

9. The method of claim 7 wherein the mixture of branched chain sodium alkanoate is obtained by hydrogenating a mixture consisting essentially of isooctanols and isooctanals, separating the isooctanols produced by said hydrogenation from higher and lower boiling material formed in the hydrogenation step and directly converting the separated isooctanols to sodium salts of the corresponding acids by contacting said separated isooctanols with sodium hydroxide at a temperature in the range of about 600 to 725° F.

10. The method of claim 7 wherein the sodium branched chain alkanoates are obtained by contacting isooctanols with sodium hydroxide at a temperature in the range of about 600 to 725° F.

11. The method of claim 7 wherein the sodium branched chain alkanoates are a mixture of sodium isooctanoates and sodium 2-ethyl hexanoate, the former predominating over the latter whereby the basic aluminum branched chain alkanoate soaps are formed by coprecipitation.

12. The method of claim 7 wherein the drying is effected in two steps and the grinding is interposed between said drying steps, the first drying step being about 140° F. and the second drying being at a substantially higher temperature to reduce the moisture content to less than .6 per cent.

13. The method of claim 7 wherein the drying is effected in two steps and the grinding is interposed between said drying steps, the first drying step being at about 140° F and the second drying step being at a temperature of about 220° F.

References Cited in the file of this patent

UNITED STATES PATENTS

| Number | Name | Date |
| --- | --- | --- |
| 1,926,059 | Pelton et al. | Sept. 12, 1933 |
| 2,390,609 | Minich | Dec. 11, 1945 |
| 2,417,071 | Gebhart et al. | Mar. 11, 1947 |
| 2,582,833 | Hunn | Jan. 15, 1952 |
| 2,584,041 | Nowak et al. | Jan. 29, 1952 |
| 2,596,844 | Clark | May 13, 1952 |
| 2,606,107 | Fieser | Aug. 5, 1952 |
| 2,618,536 | Hunn | Nov. 18, 1952 |
| 2,626,897 | Young et al. | Jan. 27, 1953 |
| 2,628,202 | Allison et al. | Feb. 10, 1953 |
| 2,638,487 | Russum et al. | May 12, 1953 |
| 2,648,694 | Mason | Aug. 11, 1953 |